Jan. 17, 1967   H. C. LIEBMANN, JR   3,298,057
APPARATUS FOR PROCESSING MEAT
Filed Dec. 28, 1964   8 Sheets-Sheet 1

Fig. 1.

INVENTOR.
Herbert C. Liebmann, Jr.
BY
Hume, Groen, Clement & Hume
ATTORNEYS.

INVENTOR.
Herbert C. Liebmann, Jr.
BY
Hume, Groen, Clement & Hume
ATTORNEYS.

United States Patent Office 3,298,057
Patented Jan. 17, 1967

3,298,057
APPARATUS FOR PROCESSING MEAT
Herbert C. Liebmann, Jr., Green Bay, Wis., assignor to Langlade Operating Company, Green Bay, Wis., a corporation of Wisconsin
Filed Dec. 28, 1964, Ser. No. 421,571
11 Claims. (Cl. 17—32)

This invention relates to meat processing apparatus and, in particular, to apparatus for automatically processing meat to yield an end product in the form of an agglomerate loaf of ground meat of predetermined configuration and size.

In the meat packing and processing industry, there have been a number of problems particularly associated with the processing of boned meat into ground meat, such as ground beef. The present procedure in the industry generally involves the following operational steps: (1) freshly boned meat is placed into a coarse grinder which serves to reduce the meat to small chuck-sized portions; (2) the meat is removed from the coarse grinder and manually mixed in a container to produce a relatively uniform mixture; (3) the meat is then transferred to a second grinder in which it is finely ground and continuously extruded, usually in a square cross-sectional configuration; (4) as the ground meat is extruded, it is manually cut at approximate lengths to produce individual loaves of ground meat; and (5) finally, the loaves are individually, manually wrapped for shipment.

A prime problem is that, in following the above procedure, it has been difficult to consistently produce end products on a large volume basis which meet the desired standards of uniform loaf size and mixture. In addition, the costs of carrying out the above procedure are high. These problems arise primarily out of two sources of difficulty with the existing methods and apparatus. Specifically, as indicated, a number of the operational steps are manually performed, in particular, the mixing, cutting and wrapping operations. In addition, the various operational steps are not integrated into a continuous, efficient system. Rather, each of the enumerated operational steps tends to be performed separately without efficient transition from one operational step to another. In short, with the present methods and apparatus the processing of boned meat into ground meat is cumbersome and inefficient.

It is an object of the present invention to provide apparatus for processing meat which is adapted automatically to perform the operations enumerated above.

It is a further object of this invention to provide apparatus for processing boned meat into ground meat which is particularly characterized by its capability for producing loaves of ground meat of uniform size and mixture on a high volume basis.

It is an additional object of this invention to provide apparatus for processing meat which is adapted to integrate a number of operations into a continuous, efficient system for the production of ground meat.

It is another object of the present invention to provide apparatus for processing meat which includes means for automatically and accurately cutting the extruded meat into loaves of predetermined length.

It is still another object of the persent invention to provide apapratus for processing meat which is particularly charcterized by a lack of human contact with the meat after the meat has been bonded and placed on a conveyor.

Briefly described, the persent invention comprises a coarse grinder, means for delivering boned meat into the coarse grinder, means for mixing the output of the coarse grinder, means for transferring the output of the coarse grinder to the mixing means, a fine grinder adapted to receive the output of the mixing means and continuously extrude finely ground meat in an agglomerate condition, a cutting mechanism for automatically cutting ground meat extruded from the fine grinder into loaves of predetermined length, one or more bagging chutes into which the loaves of meat are received and bagged, and means for transferring the loaves of meat from the cutting means to the bagging chutes.

These and other features and objects of the invention will be made apparent by reference to the specification and the drawings.

Figure 1:
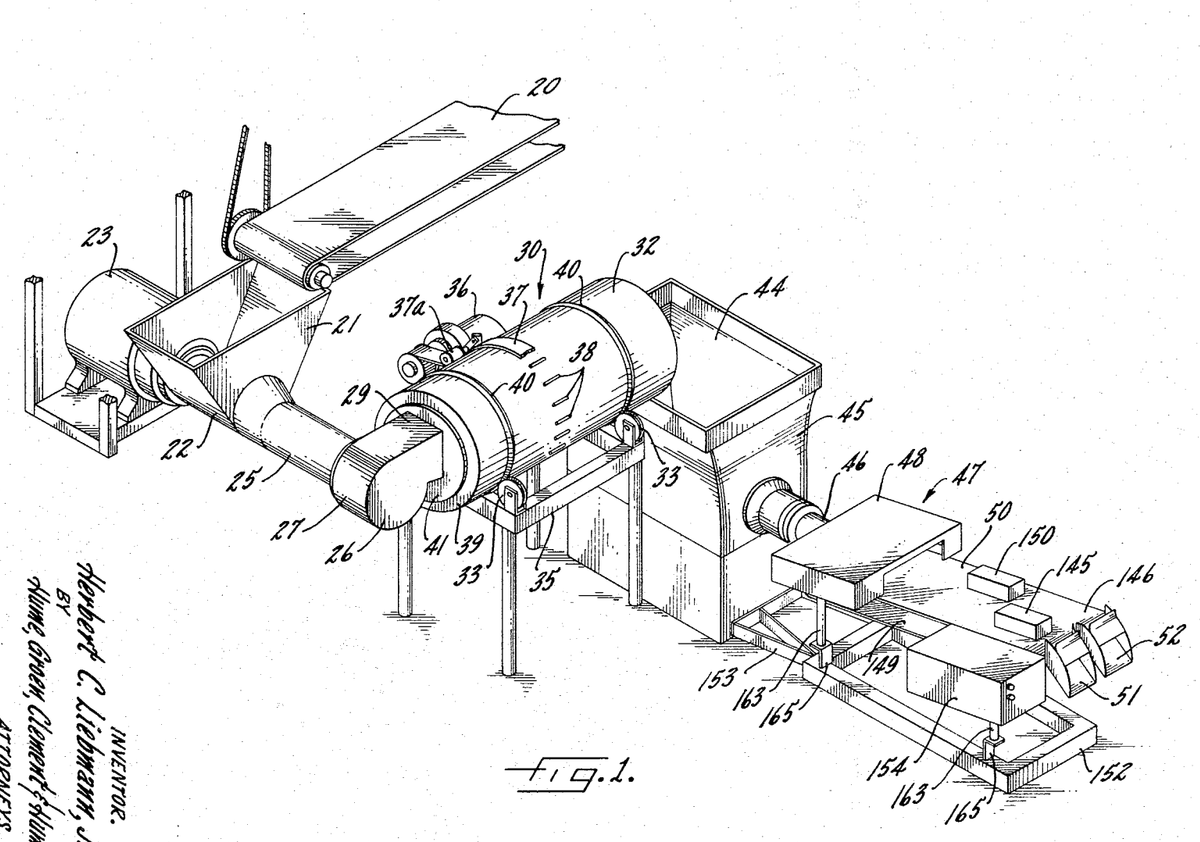
FIGURE 1 is a perspective view of the overall apparatus of this invention.

Referring now to FIGURE 1, there is shown the overall apparatus of this invention for the processing of freshly boned meat into ground meat. In order to clearly describe this apparatus, the nature and operation of the following portions of the apparatus will be described in their operational order in the meat processing operation: the input conveyor 20, the coarse grinder 22, the transfer pump 26, the mixer 30, the fine grinder 45, the cutting mechanism 47, the output conveyor 50, and the bagging chutes 51 and 52.

*The input conveyor and the coarse grinder*

The meat, beef for example, is manually boned at a boning table (not shown) and delivered by the input belt conveyor 20 into the input hopper 21 of a coarse grinder 22 which is driven by an electric motor 23. All three of these items, the conveyor 20, the coarse grinder 22, and the drive motor 23, are of conventional construction and need not be particularly described.

The function of the grinder 22 is to grind the boned meat into small chunks. This is accomplished by an auger blade 24 (shown in FIGURE 10) as it moves the meat axially through the tubular member 25 of the grinder 22. At the outer end of the tubular member 25, the coarsely ground meat enters a transfer device 26 which is in the nature of a centrifugal pump.

The transfer pump

Figure 9:
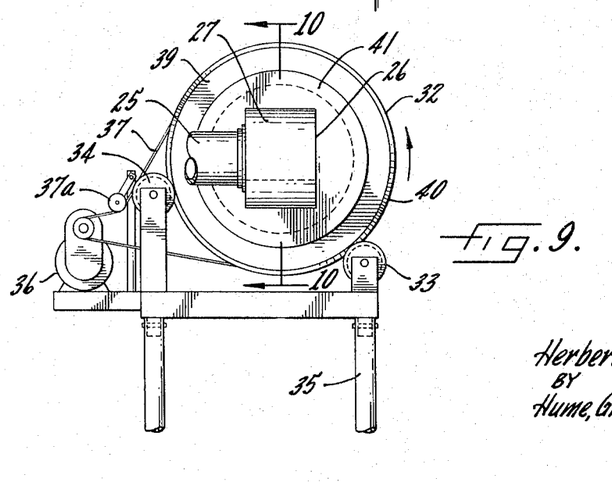
FIGURE 9 is an end view in elevation of the transfer pump and mixing drum as arranged in FIGURE 1.
Figures 10, 11:
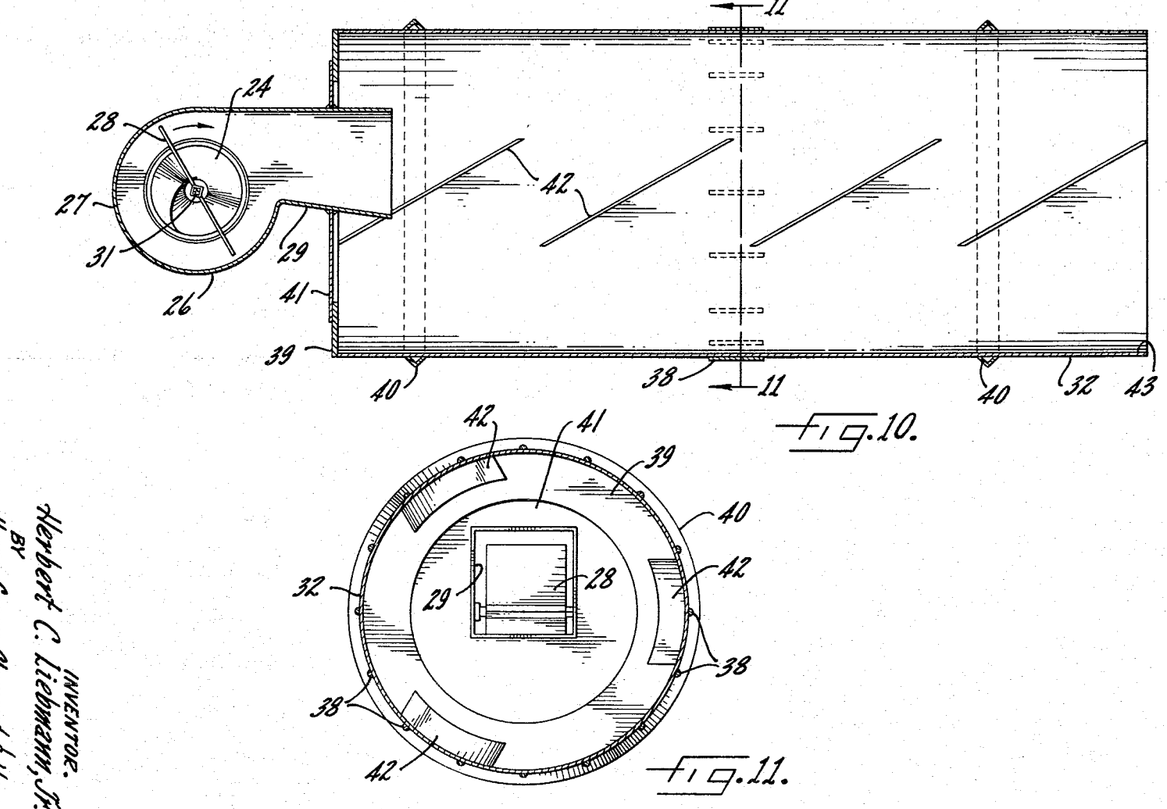
FIGURE 10 is a cross-sectional view taken at 10—10 of FIGURE 9.
FIGURE 11 is a cross-sectional view taken at 11—11 of FIGURE 10.

As shown in FIGURES 1, 9 and 10, the transfer pump 26 comprises a housing 27 adapted to accommodate the rotation and centrifugal action of the pump impeller 28. The housing 27 includes an exit conduit 29 through which the coarsely ground meat is forced into a mixer 30 by the rotation and centrifugal action of the pump impeller 28. The impeller 28 is mounted on a shaft 31 which is driven by the motor 23. The constituent parts of the pump 26 are preferably fabricated of stainless steel to prevent corrosion.

Figure 5:
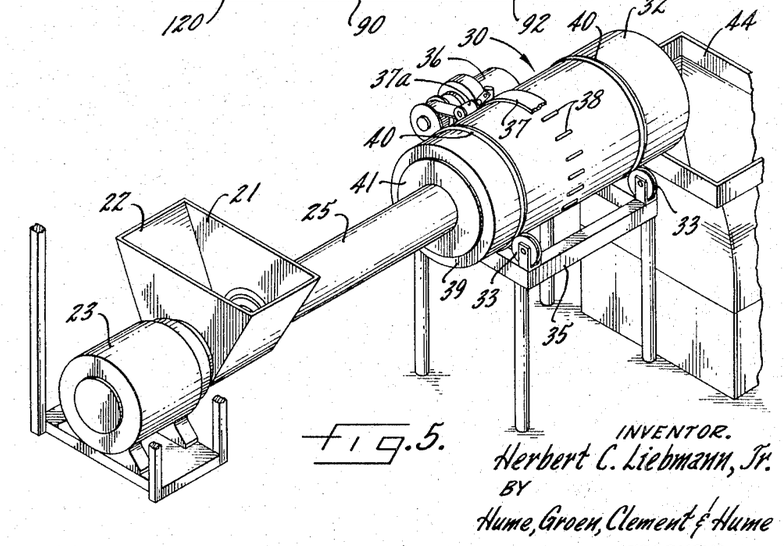
FIGURE 5 is a perspective view illustrating an arrangement of the core grinder and the mixer without the transfer pump.

The transfer pump 26 provides a convenient means for transferring the coarsely ground meat from the coarse grinder 26 to the mixer 30. It turns a 90-degree corner, thereby permitting a more compact arrangement of the overall apparatus. In addition, it may be removed to permit access to the output end of the coarse grinder 22 and the input end of the mixer 30 without the necessity of moving the coarse grinder 22 or the mixer 30. Thus, while the transfer pump is a useful part of the apparatus, it is not an indispensable part and may be omitted without altering the basic nature of the overall apparatus, as illustrated in FIGURE 5.

The mixer

Referring to FIGURES 1 and 9, it is seen that the mixer or blender 30 comprises a cylindrical mixer drum 32 supported for axial rotaiton on two pairs of freely rotating support rollers 33 and 34 mounted on a frame 35. The pair of support rollers 34 is positioned higher than the pair of support rollers 33, as best shown in FIGURE 9, in order that the mixer drum 32 can be rotatably driven by a conveniently side-mounted motor 36. The motor 36 drives the mixer drum 32 in the counterclockwise rotational direction indicated in FIGURE 9 by means of a drive belt 37, preferably a cleated drive belt. A spring-loaded roller 37a is mounted to bear inwardly against the belt 37, as best shown in FIGURE 9, to provide a tension level in the belt 37 sufficient to assure traction of the belt 37 with the mixer drum 32. Drive traction of the belt 37 with the mixer drum 32 is further enhanced by affixing a plurality of elongated cleats 38 circumferentially about the mixer drum 32 and parallel to the axis of the drum for engagement by the belt 37. It has been found that a pair of effective cleats may be fabricated by longitudinally splitting in half a metal rod of approximately four inches in length. To maintain the mixer drum 32 in an axially fixed position, two metal angle strips are circumferentially affixed as ribs 40 to the drum 32, and the support rollers 33 and 34 are provided with compatible V-notched rims in which the ribs 40 track.

Referring now to FIGURES 1, 9, 10, and 11, it is seen that at its entrance the mixer drum 32 is provided with an annular flange 39. A disk 41 rigidly mounted on the transfer pump conduit 29 is positioned adjacent, and in an overlapping relationship with, the flange 39 so as to provide a closure for that end of the mixer drum 32. As depicted in FIGURE 10, the conduit 29 preferably extends an appreciable distance into the mixer drum 32. The interior of the mixer drum 32 is provided with three longitudinal rows of guide vanes 42 rigidly secured to the side wall of the mixer drum 32. The guide vanes are angularly positioned relative to the axis of the drum 32 such that rotation of the mixer drum 32 in the direction indicated in FIGURE 9 results not only in a mixing of the coarsely ground meat but also in movement of the coarsely ground meat toward and out of the discharge opening 43 in the other end of the mixer drum 32. This angular orientation of the guide vanes 42 is best illustrated in FIGURE 10. It has been found in practice that the action of the rotating drum 32 and the guide vanes 42 is capable of consistently providing a mixture of coarsely ground meat in large quantities with a high degree of uniformity. As in the transfer pump 26, the various constituent parts of the mixer 30 which come into contact with the meat are preferably fabricated from stainless steel.

The fine grinder

Figure 6:
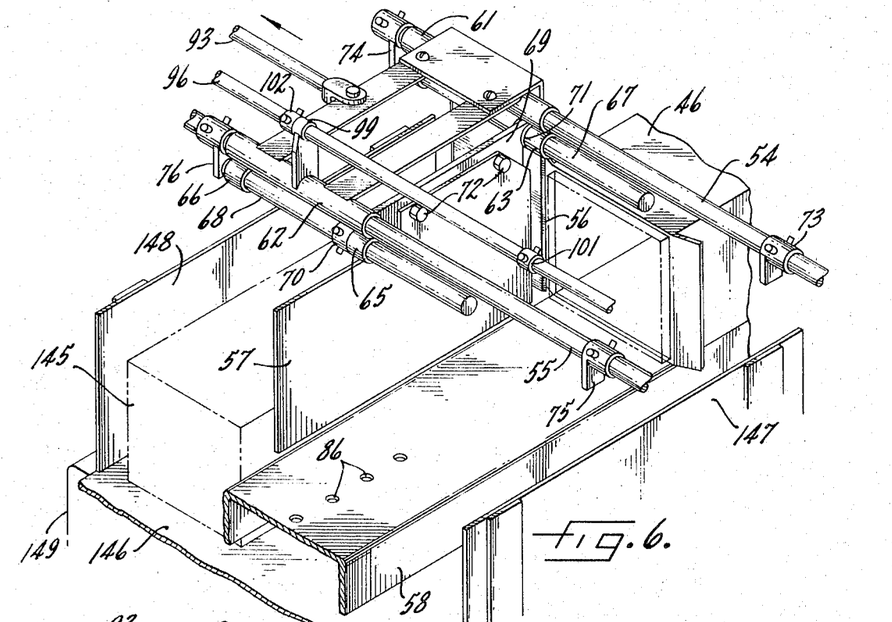
FIGURES 6, 7 and 8 are perspective views of a portion of the cutting mechanism illustrating the time sequence and nature of the automatic slicing operation.

From the discharge opening 43 of the mixer drum 32, the coarsely ground mixed meat is deposited in the hopper 44 of a second grinder 45. The grinder 45 finely grinds the meat and continuously extrudes it in an agglomerate condition from a nozzle 46. The grinder 45 is conventional in construction and, hence, need not be particularly described. In FIGURE 6, a quantity of meat is depicted in phantom view beginning its exit from the discharge end of the nozzle 46. From the nozzle 46 the extruded meat enters the cutting mechanism 47 which, as illustrated in FIGURE 1, is preferably housed by a stainless steel casing 48. The function of the cutting mechanism is to accurately cut the extruded ground meat into loaves of predetermined length and to deposit these onto a conveyor 50 which transports the loaves to the bagging chutes 51 and 52.

The cutting mechanism

Figure 2:
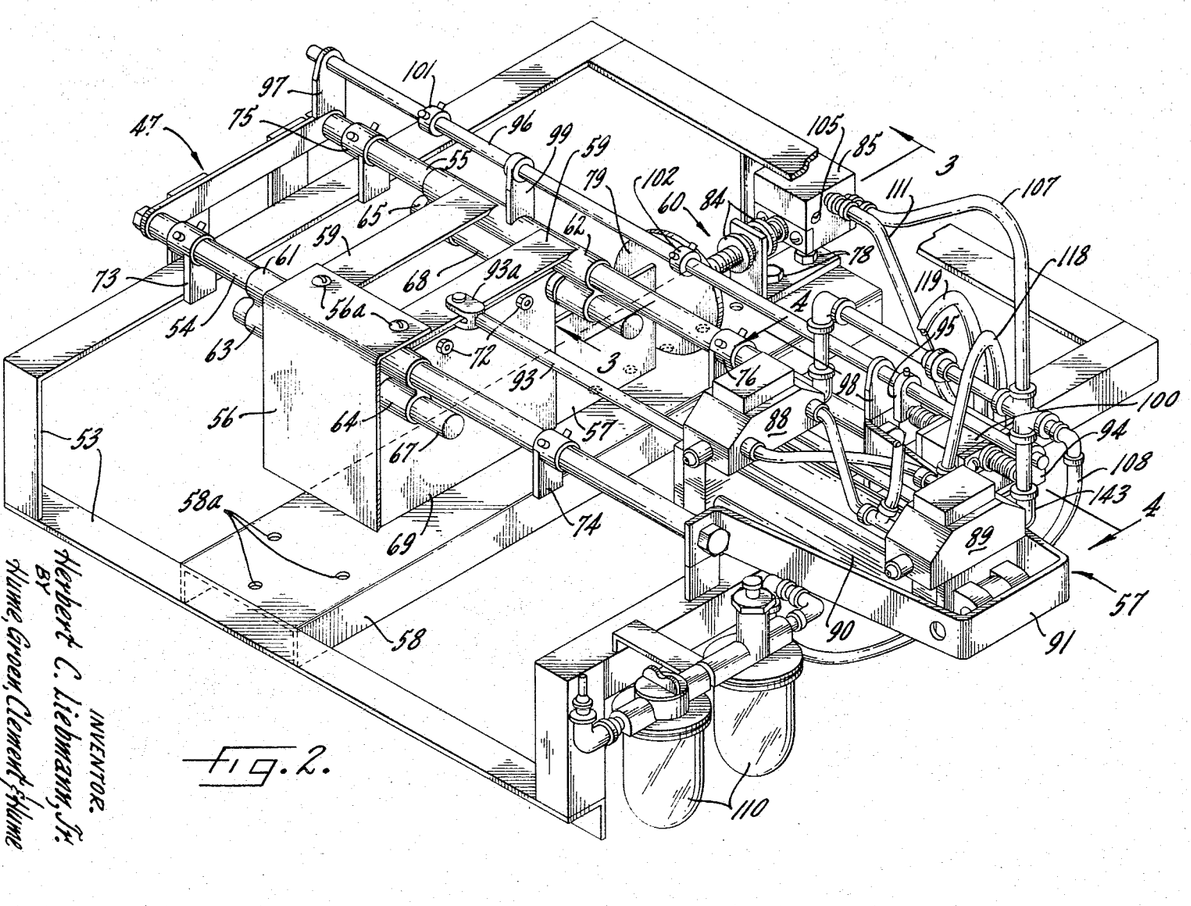
FIGURE 2 is a perspective view of the cutting mechanism.

Referring to FIGURE 2, the cutting mechanism 47 is shown mounted on a frame 53. A rectangular base plate 58 of narrower width than the frame 53 is rigidly affixed to the frame 53. The base plate 58 is provided with a number of holes 58a through which bolts (not shown) are passed to mount the cutting mechanism on the grinder nozzle 46. The frame 53 carries a pair of support rods 54 and 55 which extend across the width of the cutting mechanism 47 and support the transverse travel of a cutting blade 56 and a pushing plate 57, as hereinafter described.

Figure 7:
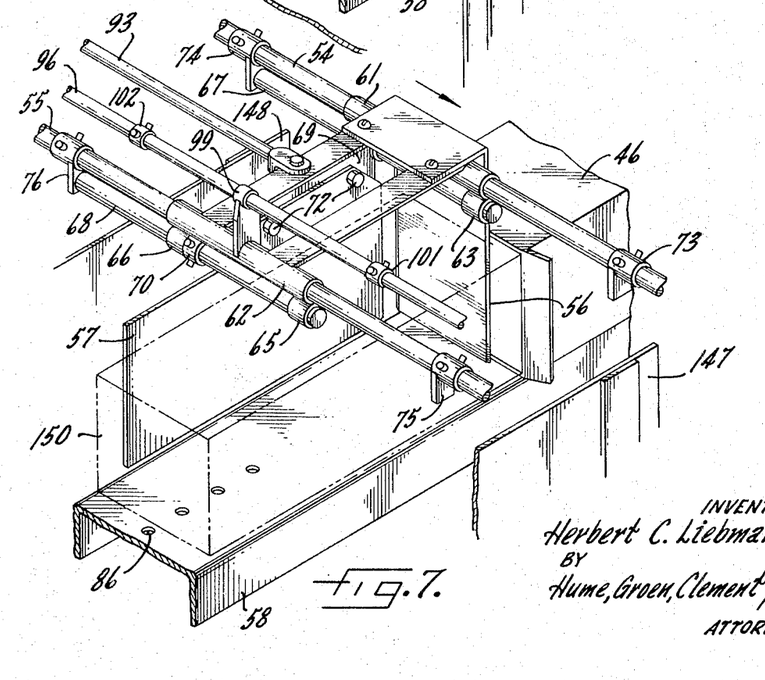
Figure 8:
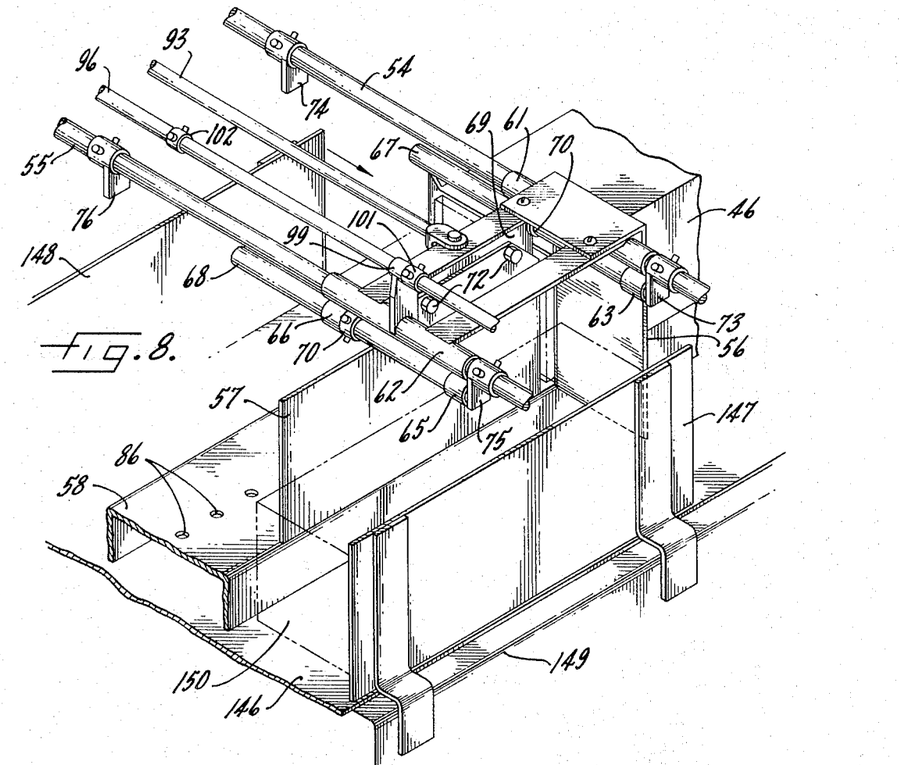

The cutting blade 56 is secured to a pair of cross members 59 by means of screws 56a. The cross members 59, in turn, are rigidly affixed at one end to a tubular travel member 61 and at their other end to a second tubular travel member 62. If desired, a single cross plate may be used in lieu of the pair of cross members 59. The tubular travel member 61 is slidably mounted on the support rod 54 for travel axially of the support rod 54. Similarly, the tubular travel member 62 is slidably mounted on the support rod 55 for travel axially of the support rod 55. A pair of axially-spaced tubular support members 63 and 64 are rigidly affixed to the tubular travel member 61 in underslung positions at each end of the tubular travel member 61. Similarly, tubular support members 65 and 66 are affixed to the tubular travel member 62 in underslung positions at each end of the tubular travel member 62. A rod 67 is slidably engaged in the tubular support members 63 and 64 and a rod 68 is slidably engaged in the tubular support members 65 and 66. As best shown in FIGURES 6 through 8, a plate 69 is affixed to support rings 70 and 71 which, in turn, are positioned on and secured by set screws to rods 67 and 68, respectively. The pushing plate 57 is affixed to the plate 69 by bolt and nut fasteners 72. On the support rod 54 there are mounted two stop lugs 73 and 74 to prevent overtravel by the travel rod 67. The stop lugs 73 and 74 are selectively positioned and secured to the support rod 54 by set screws. In corresponding positions on the support rod 55 are mounted two stop lugs 75 and 76 which are selectively positioned and secured to the travel rod 55 by set screws. The stop lugs 75 and 76 define the limits of travel of the travel rod 68.

Figure 3:
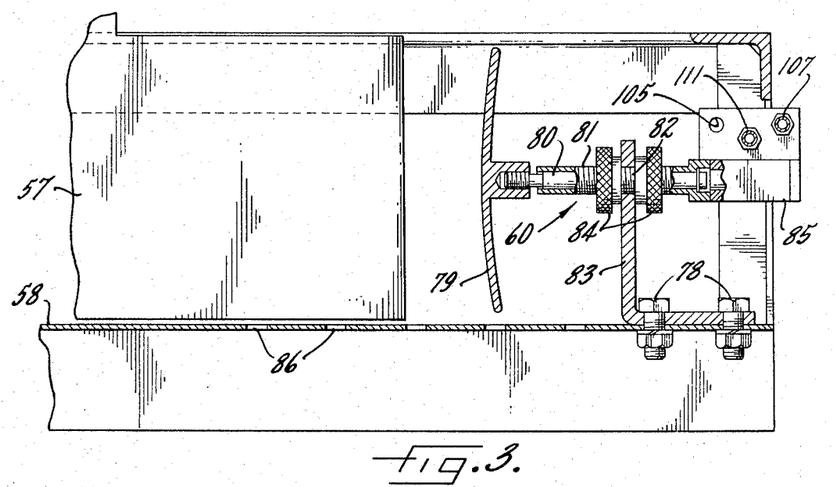
FIGURE 3 is an elevational view, partly in section, of a portion of the cutting mechanism taken at 3—3 of FIGURE 2.

A trigger assembly 60 for actuating the cutting mechanism 47 is mounted on one end of the base plate 58 by bolt and nut fasteners 78, as illustrated in FIGURES 2 and 3. The trigger assembly 60 includes a contact plate or button 79 which is threaded unto the end of a bonnet stem 80 which, in turn, is slidably engaged in the tubular bonnet 81. The bonnet 81 is externally threaded and extends through an aperture 82 in the support bracket 83. The position of he bonnet 81, and in turn the contact plate 79, with respect to the bracket 83 may be selectively varied by adjusting the lock nuts 84. The inner end of the bonnet stem 80 is adapted to actuate a force-sensitive, pneumatic trigger valve 85, as hereinafter described. It should be noted that, as shown in FIGURE 3, a series of positioning holes 86 are provided in the base plate 58 in order that the bracket 83 and, hence, the contact plate 79 may be coarsely positioned at varied distances from the discharge end of the extruding nozzle 46. As indicated, the precise positioning of the contact plate 79 is achieved by adjustment of the lock nuts 84.

Figure 4:
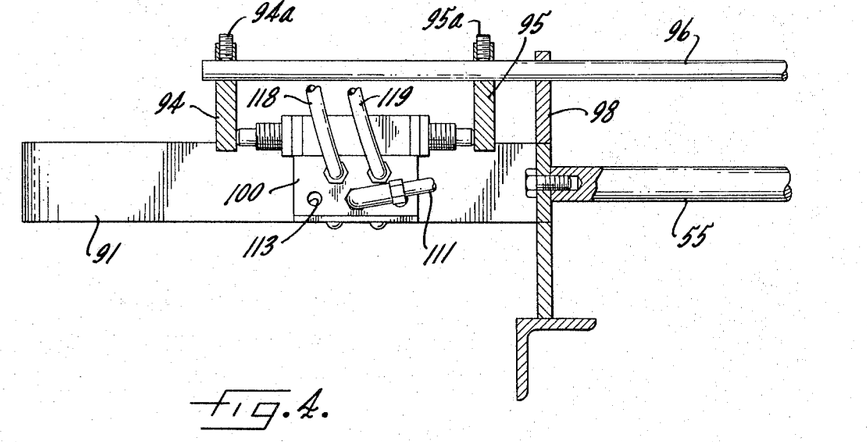
FIGURE 4 is an elevational view, partly in section, of another portion of the cutting mechanism taken at 4—4 of FIGURE 2.

For driving the cutting blade 56, a pneumatic drive assembly is provided which comprises generally a double acting piston-and-cylinder drive unit 90 provided with a control valve 88 at the forward end of the cylinder and a control valve 89 at the opposite end of the cylinder. The piston-and-cylinder drive unit 90 with its associated control valves 88 and 89 is mounted on a secondary frame 91 affixed to the frame 53. Interconnected with the control valves 88 and 89 and the trigger valve 85 is a reversing valve 100 which is mounted on the frame 53. The piston of the drive unit 90 is connected through a shaft 93 and coupling 93a to one of the cross members 59 for driving the blade 56. The function of the reversing valve 100 is to reverse the direction of drive exerted by the drive unit 90 on the blade 56. As illustrated in FIGURES 2 and 4, the reversing valve 100 is operated by a pair of lugs 94 and 95 which are positioned on a reversing rod 96 by means of set screws 94a and 95a. The reversing rod 96 is slidably mounted in support members 97 and 98. An impact member 99 is rigidly affixed to the tubular travel member 62 and is slidably engaged about the reversing rod 96. A pair of rings 101 and 102 are mounted on the reversing rod 96 and securely positioned on opposite sides of the impact member 99 by set screws. The reversing rod 96 is moved in one direction when the impact member 99 impinges against the ring 102 and in an opposite direction when the impact member 99 impinges against the ring 101. The reversing valve 100 is responsive to the movements of the reversing rod 96 in a manner described hereinafter.

Figure 14:
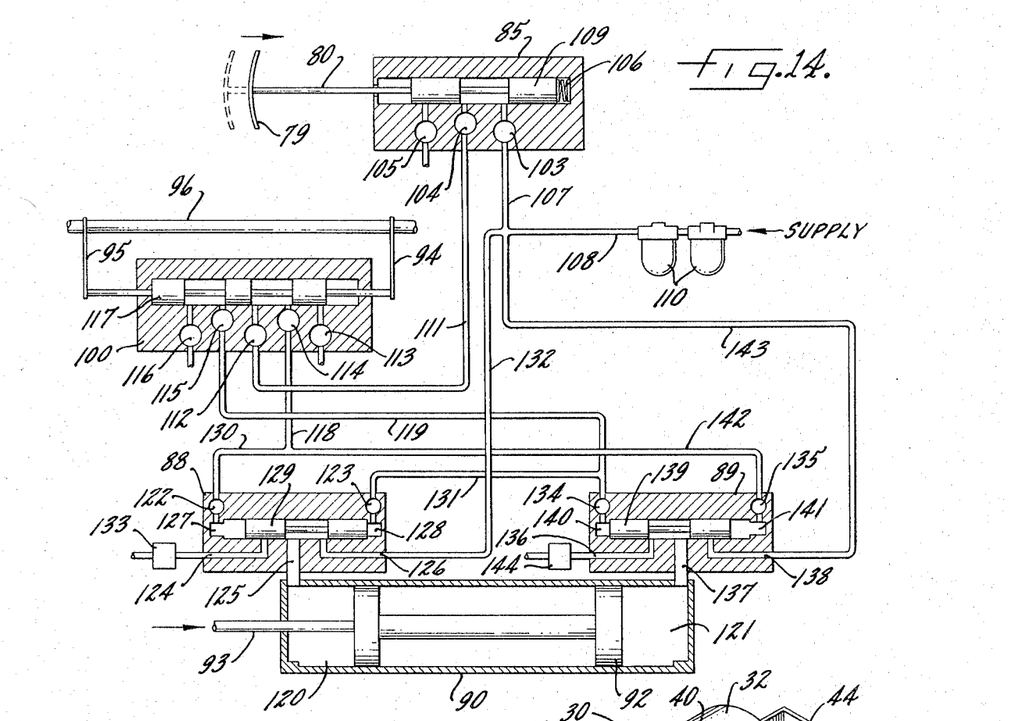
FIGURE 14 is a schematic diagram of the cutting mechanism penumatic circuitry.

The working interrelationship between the trigger valve 85, the reversing valve 100, and the drive unit 90 is best described by reference to FIGURE 14 in which there is shown a schematic diagram of the pneumatic circuitry of the cutting mechanism 47. The conduits shown schematically in FIGURE 14 corresponds to the similarly numbered conduits shown in FIGURE 2. It is seen that the trigger valve 85 is provided with three ports, 103, 104 and 105. A poppet 109 connected to the bonnet 80 is caused by a spring 106 to normally provide communication between ports 104 and 105. When the impact plate 79 is forced inwardly as indicated by the arrow, the poppet 109 is moved against the spring 106 into a position providing communication between ports 104 and 103 and blocking communication between ports 105 and 104. As connected into the pneumatic circuitry, the port 103 is coupled to a conduit 107 which, in turn, is connected through conduit 108 and air filters 110 to a source of supply pressure, normally an air compressor (not shown). The port 104 is connected via conduit 111 to port 112 in the reversing valve 100. The port 105 of the trigger valve 85 serves as an exhaust to atmosphere.

The reversing valve 100 is provided with five ports, 112, 113, 114, 115 and 116. A poppet 117 responds to the movement of the reversing rod 96 transmitted through the lugs 94 and 95 to occupy one of two operative positions. When the operating rod 96 is moved to the left in FIGURE 14, force is transmitted through the lug 94 to move the poppet 117 forward into an operative position in which communication is provided between ports 112 and 114 and between ports 115 and 116. Hence, supply pressure communicated to port 112 via conduit 111 is communicated to the conduit 118 via the port 114. The conduit 119, on the other hand, is exhausted to atmosphere via the port 115 and the exhaust port 116. This is the condition of valve 100 as depicted in FIGURE 14. When the reversing rod is moved rearwardly so as to force the poppet 117 rearwardly, supply pressure will be applied to conduit 119 via the conduit 111 and ports 112 and 115. With the poppet 117 in this operative positon, the conduit 118 is exhausted to atmosphere via the post 114 and the exhaust port 113.

The drive unit 90 is provided with drive pressure chambers 120 and 121 at opposite ends controlled by valves 88 and 89, respectively. The valve 88 is provided with five ports 122, 123, 124, 125 and 126. The ports 122 and 123 communicate respectively with control pressure chambers 127 and 128 which are provided for the purpose of driving the poppet 129. The port 122 is coupled via conduit 130 to the conduit 118 from the reversing valve 100. The port 123, on the other hand, is coupled via the conduit 131 to the conduit 119 from the reversing valve 100. The port 125 provides communication between the valve 88 and the cylinder chamber 120. The port 126 is connected via the conduit 132 to the supply pressure source. The remaining port 124 is an exhaust port which is preferably provided with a conventional muffler and speed control device 133. When the conduit 118 from the reversing valve 100 is at supply pressure and the conduit 119 from reversing valve 100 is at exhaust pressure, the poppet 129 of the valve 88 is forced by the presence of supply pressure in the chamber 127 into the position shown in FIGURE 14 in which communication is established between the supply pressure port 126 and the cylinder port 125, resulting in the buildup of supply pressure in the cylinder chamber 120. The valve 89 is similar to the valve 88. It is provided with five ports, 134, 135, 136, 137 and 138. The valve 89 also includes a poppet 139 which is driven by the presence of supply pressure in one of the control pressure chambers 140 and 141. The pressure chamber 140 is connected via the port 134 to the conduit 119 from the reversing valve 100. The pressure chamber 141, on the other hand, is connected via the port 135 and the conduit 142 to the conduit 118 from reversing valve 100. The port 138 is connected via the conduit 143 to the supply pressure source. Port 146 is an exhaust port also provided with a conventional muffler and speed control device 144. Finally, the port 137 serves to connect the valve 89 with the cylinder pressure chamber 121. Hence, when the conduit 118 from the reversing valve 100 is at supply pressure and the conduit 119 is at exhaust pressure, the poppet 139 of the valve 89 is forced by the presence of supply pressure in the chamber 141 into the position shown in FIGURE 14 wherein communication is established between the port 137 and the exhaust port 126. Thus, under the pressure conditions depicted in FIGURE 14, the piston 92 is forced rearwardly causing the shaft 93 to travel in the direction indicated by the arrow.

The operation of the cutting mechanism is characterized by the reciprocal movement of the cutting blade 56 and pushing plate 57, an efficient arrangement which cuts and deposits alternate loaves of ground meat in staggered positions on the output conveyor 50. The movement of the pushing plate 57 is delayed on each cutting stroke until the cutting blade 56 has completed a substantial part of its cut through the ground meat.

Referring now to FIGURES 6, 7 and 8, a time sequence of movement of the cutting blade 56 and the pushing plate 57 is illustrated. In FIGURE 6, a loaf of meat 145 has been separated by the cutting action of the blade 56 moving across the discharge opening of the nozzle 46 in the direction indicated by the arrow and pushed off the base plate 58 onto the conveyor belt 146 by the action of the pushing plate 57. The movement of the blade 56 and the pushing plate 57 up to this point would be effected by the pneumatic circuitry in the particular operative condition illustrated in FIGURE 14. Tracing the sequence of events from approximately this point in time, it will be apparent that, as drive shaft 93 approaches its maximum point of retraction, the member 99 abuts against the stop 102, causing the reversing rod 96 via the reversing lug 95 to switch the position of the poppet 117 of the reversing valve 100. This position of the poppet 117 exhausts the supply pressure condition in the pressure chambers 127 and 141 of the cylinder valves 88 and 89, respectively, by establishing communication between the conduit 118, the port 114, and the exhaust port 113. The new position of the poppet 117 also establishes communication between the conduit 111 and the conduit 119. Cylinder valves 88 and 89 are thereby conditioned to effect travel of the drive piston 92 in the reverse direction upon actuation of the trigger valve 85.

When the leading surface of the ground meat shown being extruded in FIGURE 7 approaches and impinges against the contact plate 79, supply pressure is transmitted through the trigger valve 85 and reversing valve 100 to the control pressure chambers 128 and 140 of the cylinder valves 88 and 89, respectively. The positions of the poppets 129 and 139 are thereby changed such that the cylinder pressure chamber 120 is exhausted while supply pressure builds up in the cylinder pressure chamber 121. Accordingly, the drive piston 92 begins travel in the reverse direction, causing extension of the shaft 93 from the drive unit 90. The cutting blade 56 is thereby forced through the extruded length of ground meat, cutting off another loaf 150 of the desired length, as depicted in FIGURE 7. As the cutting blade 56 reaches a point approximately four fifths of the distance through the extruded mass of ground meat, the tubular support members 63 and 65 abut against the pushing plate support rings 71 and 70, causing the pushing plate 57 to begin travel with the cutting blade 56. This is the point in time illustrated in FIGURE 7. Hence, as the cutting blade 56 completes its cut, the pushing plate 57 urges the newly cut loaf 150 off of the base plate 58 onto the conveyor belt 146. To assure the proper positioning of the loaves on the conveyor belt 146, guard plates 147 and 148 are mounted on the opposite sides of the conveyor frame 149 adjacent the side edges of the conveyor belt 146. As the cutting blade 56 completes its traverse across the discharge nozzle 46 opening and the pushing plate 57 completes its action of depositing the loaf 150 onto the conveyor belt 146, the member 99 abuts against the ring 101, the respective ends of the rods 67 and 68 and the respective support members 61 and 62 abut against the overtravel stops 73 and 75, as illustrated in FIGURE 8. This completes another stroke of the cutting mechanism and conditions it to effect a stroke in the reverse direction by the cutting blade 56 and the pushing plate 57 when the contact plate 79 is again engaged.

It should be noted that when a relatively short loaf of ground meat is desired as the end product, the contact plate 79 may be readily repositioned and the normal pushing blade 57 may be removed and the plate 69 alone utilized as the "pushing plate."

Preferably, all parts of the cutting mechanism 47 other than various portions of the pneumatic circuitry are fabricated of stainless steel to prevent corrosion and facilitate cleaning.

*The output conveyor*

From the foregoing description, it is apparent that the cutting mechanism 47 serves to cut the meat being extruded from the nozzle 46 into loaves of accurate size and to deposit alternate loaves on the conveyor belt 146 in laterally staggered positions, as illustrated in FIGURE 1. As seen in FIGURE 1, the succeeding loaves 145 and 150 proceed on the conveyor belt toward the respective bagging chutes 51 and 52. The flat endless belt 146 of the output conveyor 50 is conventionally driven by a drive roll 167 coupled to a motor (not shown) mounted within the casing 154 which is affixed to one side of the conveyor frame 149. The conveyor frame 149, in turn, is supported by a stable structure 152 which is secured to the grinder 45 by structural members 153. If desired, the support sructure 152 may be provided with casters to make it readily movable. In addition, the casing 154 may serve, if desired, to house a central control panel for the various drive motors of the overall apparatus.

Figure 12:
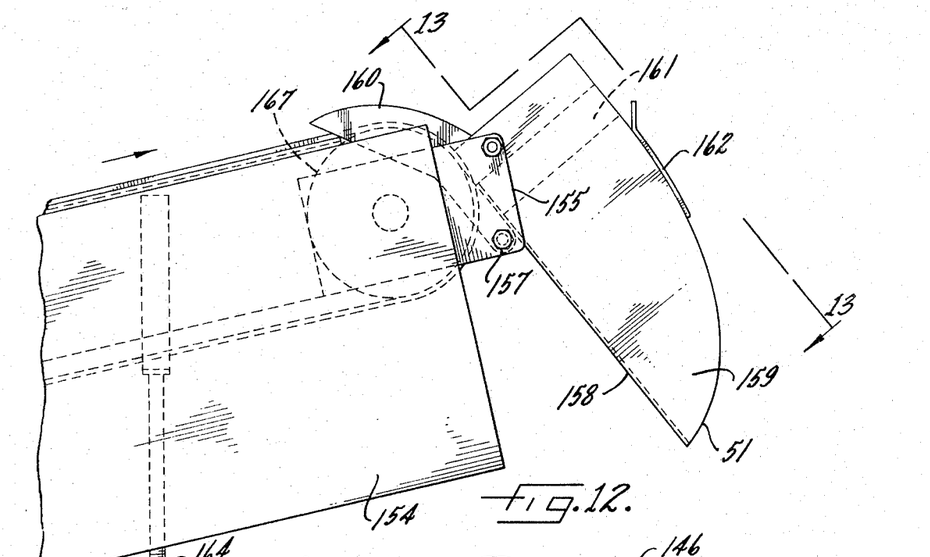
FIGURE 12 is a side view in elevation of the bagging chutes and a portion of the bagging conveyor.

The conveyor frame 149 preferably includes four adjustable legs 163 to enable the height of either end of the conveyor 50 to be adjusted so that at one end the conveyor may be properly adjusted with respect to the cutting mechanism 47, and at the other end the bagging chutes 51 and 52 may be positioned at an optimum height for working conditions. A typical structure for the legs 163 is illustrated in FIGURE 12. As shown, the leg 163 comprises a threaded shaft 164 which is fastened to a supporting L-shaped bracket 165 by lock nuts 166.

*The bagging chutes*

Figure 13:
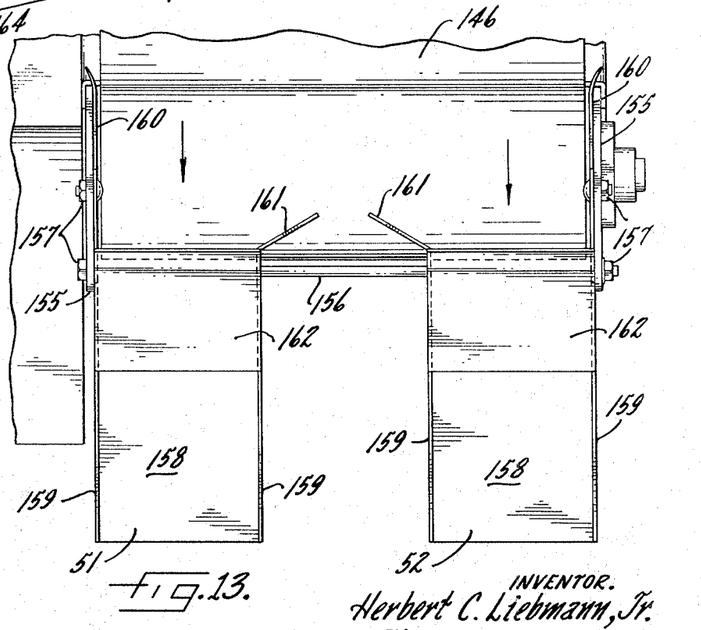
FIGURE 13 is a top view in elevation of the bagging chutes and a portion of the bagging conveyor.

As illustrated in FIGURES 12 and 13, the bagging chutes 51 and 52 are of similar structure and are mounted on plates 155 which extend from the conveyor frame 149 at its discharge end by an elongated bolt and nut fastener 156 plus the additional bolt and nut fasteners 157. The bagging chutes 51 and 52 each comprise a base plate 158, side plates 159, a pair of side guide plates 160 and 161, and a top guide plate 162. The bagging chutes are mounted in a downwardly oriented position as illustrated in FIGURES 1 and 12. The lower portions of the side plates 159 include a curved edge portion 168 such that a bag, preferably a polyethylene bag, may be easily slipped over the lower end of the bagging chute to receive a loaf of ground meat as it slides down the bagging chute. The side guide plates 160 and 161 and the top guide plate 162 serve to direct the loaf of ground meat into the bagging chute. In this manner the loaf is easily and quickly caught in a protective bag, the end of which may then be readily sealed, all without human contact with the loaf of ground meat. The bagging chutes are preferably fabricated of stainless steel.

From the foregoing description it is seen that the present invention provides apparatus for processing meat which integrates the various steps of processing boned meat into ground meat into a continuous, efficient system. It has been found that this apparatus is capable of producing loaves of ground meat of uniform size and mixture on a high volume basis.

It should be understood that although particular embodiments of this invention have been described and shown herein, this is merely by way of example and explanation. It will be apparent that certain modifications may be made within the scope of the claims without departing from the spirit of the invention.

What is claimed is:

1. In apparatus for processing meat, including a grinder for extruding ground meat in an agglomerate condition the combination comprising: a cutting mechanism for cutting the ground meat extruded from said grinder into loaves; at least one downwardly oriented chute adapted to receive loaves of ground meat and deliver the same into a container; and means for transporting the loaves of ground meat from said cutting mechanism to said chute, said cutting mechanism including a cutting blade, pneumatic drive means effective when actuated to cause a cutting stroke of said cutting blade in a first direction or second direction transversely of the direction of extrusion of the ground meat, reversing means operative when said cutting blade has completed a cutting stroke in said first or second direction to condition said pneumatic drive means to drive said cutting blade in the other direction when said pneumatic drive means is next actuated, and force-sensitive means for actuating said pneumatic driving means when said force-sensitive means is contacted by the leading edge of the ground meat from said grinder such that the ground meat being extruded is cut into loaves of predetermined length.

2. In apparatus for processing meat including a grinder for extruding ground meat in an agglomerate condition, the combination comprising: a cutting mechanism for cutting the ground meat extruded from said grinder into loaves; a pair of downwardly oriented chutes adapted to receive loaves of ground meat and deliver the same into a container; and a conveyor for receiving and transporting the loaves of ground meat from said cutting mechanism to said chutes, said cutting mechanism comprising a cutting blade, pneumatic drive means adapted when actuated to effect cutting movement of said cutting blade in a first direction or second direction transversely of the direction of extrusion of the ground meat, reversing means operative when said cutting blade has completed a cutting stroke in said first or second direction to condition said pneumatic drive means to drive said cutting blade in the other direction when next actuated, force-sensitive valve means adapted to actuate said pneumatic drive means and positioned in the path of travel of the ground meat as the same is extruded such that when the leading edge of the extruded ground meat has traveled a predetermined distance it impinges against said force-sensitive valve means actuating said pneumatic drive means to effect a cutting stroke of said cutting blade, a pushing plate mounted for movement in the direction of movement of said cutting blade, and means for effecting travel of said pushing plate with said cutting blade when said cutting blade has completed a predetermined portion of a cutting stroke such that each loaf of ground meat is pushed onto said conveyor as it is separated.

3. In apparatus for processing meat, including a grinder for extruding ground meat in an agglomerate condition, a cutting mechanism for cutting the ground meat extruded from the grinder into loaves of predetermined length comprising: a cutting blade; means for driving said cutting blade, said cutting blade drive means being effective when actuated to cause a cutting stroke of said cutting blade in a first direction or second direction transversely of the direction of extrusion of the ground meat; reversing means operative when said cutting blade has completed a cutting stroke in said first direction or said second direction to condition said cutting blade drive means to drive said cutting blade in the other direction when said cutting blade drive means is next actuated; and force-sensitive means for actuating said cutting blade driving means when contacted by the leading edge of the ground meat being extruded from said grinder such that the ground meat is cut into loaves of predetermined length.

4. In apparatus for processing meat, including a grinder for extruding ground meat in an agglomerate condition, a cutting mechanism for cutting the ground meat extruded from the grinder into loaves of predetermined length comprising: a cutting blade; pneumatic drive means adapted when actuated to effect cutting movement of said cutting blade in a first direction or second direction transversely of the direction of extrusion of the ground meat; reversing means operative when said cutting blade has completed a cutting stroke in said first or second direction to condition said pneumatic drive means to drive said cutting blade in the other direction when next actuated; force-sensitive valve means adapted to actuate said pneumatic drive means and positioned in the path of travel of the ground meat as the same is extruded such that when the leading edge of the extruded ground meat has traveled a predetermined distance it impinges against said force-sensitive valve means actuating said pneumatic drive means to effect a cutting stroke of said cutting blade; a pushing plate mounted for travel in the direction of movement of said cutting blade; and means for effecting travel of said pushing plate with said cutting blade when said cutting blade has completed a predetermined portion of each cutting stroke such that each loaf of ground meat is discharged from said cutting mechanism as it is separated.

5. In apparatus for processing meat, including a grinder for extruding ground meat in an agglomerate condition, a cutting mechanism for cutting the ground meat extruded from the grinder into loaves of predetermined length comprising: a cutting blade; a double acting piston-and-cylinder unit adapted when actuated to effect cutting movement of said cutting blade in a first or second direction transversely of the direction of extrusion of the ground meat and provided with a first cylinder pressure chamber at one end of said cylinder and a second cylinder pressure chamber at the opposite end of said cylinder; a source of pneumatic fluid at supply pressure; a first pressure-actuated control valve associated with said first cylinder pressure chamber and adapted in a first operative position to exhaust said first cylinder pressure chamber and adapted in a second operative position to connect said first cylinder pressure chamber to the said supply pressure source; a second pressure actuated control valve associated with said second cylinder pressure chamber and adapted in a first operative position to connect said second cylinder pressure chamber to said source of supply pressure and adapted in a second operative position to exhaust said second cylinder pressure chamber; a force-sensitive reversing valve having first and second operative positions; a force-sensitive trigger valve provided with a contact plate and interconnected between said source of supply pressure and said reversing valve, said contact plate being positioned in the path of travel of the ground meat as the same is extruded such that when the leading edge of the extruded ground meat has traveled a predetermined distance it impinges against said contact plate causing said trigger valve to connect said reversing valve to said source of supply pressure, said reversing valve being connected to each of said first and second control valves such that said reversing valve when in its first operative position and when connected to said source of supply pressure by said trigger valve is adapted to cause said first and second control valves to move into their respective first operative positions whereby said cutting blade is driven in said first direction, said reversing valve further being connected to said first and second control valves such that when said reversing valve is in its second operative position and when connected to said source of supply pressure by said trigger valve said reversing valve is adapted to cause said first and second control valves to move into their respective second operative positions whereby said cutting blade is driven in said second direction; means for switching said reversing valve into its second operative position when said cutting blade has completed a cutting stroke in said first direction and for switching said reversing valve into its first operative position when said cutting blade has completed a cutting stroke in said second direction; a pushing plate mounted for travel in the direction of movement of said cutting blade; and means associated with said cutting blade to cause said pushing plate to travel with said cutting blade when said cutting blade has completed a predetermined portion of each cutting stroke, such that each loaf of ground meat is discharged from said cutting mechanism as it is separated.

6. Apparatus for processing meat comprising: a first grinder for coarsely grinding the meat; a mixer for receiving and mixing the coarsely ground meat from the first grinder; a second grinder adapted to receive the mixed, coarsely ground meat from the mixer and to continuously extrude finely ground meat in an agglomerate condition; a cutting mechanism for cutting the ground meat extruded from said second grinder into loaves of predetermined length, said cutting mechanism comprising a cutting blade, drive means effective when actuated to cause a cutting stroke of said cutting blade in a first direction or second direction transversely of the direction of extrusion of the ground meat, reversing means operative when said cutting blade has completed a cutting stroke in said first or second direction to condition said drive means to drive said cutting blade in the other direction when said drive means is next actuated, and force-sensitive means for actuating said drive means when contacted by the leading edge of the ground meat being extruded from said second grinder; at least one downwardly-oriented chute adapted to receive the loaves of ground meat and deliver the same into a container; and means for transporting the loaves of ground meat from said cutting mechanism to said chute.

7. Apparatus for processing meat comprising: a first grinder for coarsely grinding the meat; a mixer for receiving and mixing the coarsely ground meat from the first grinder; a second grinder adapted to receive the mixed, coarsely ground meat from the mixer and to continuously extrude finely ground meat in an agglomerate condition; a cutting mechanism for cutting the ground meat extruded from said second grinder into loaves of predetermined length; at least one downwardly-oriented chute adapted to receive the loaves of ground meat and deliver the same into a container; and means for transporting the loaves of ground meat from said cutting mechanism to said chute, said cutting mechanism comprising a cutting blade, pneumatic drive means adapted when actuated to effect cutting movement of said cutting blade in a first direction or second direction transversely of the direction of extrusion of the ground meat, reversing means operative when said cutting blade has completed a cutting stroke in said first or second direction to condition said pneumatic drive means to drive said cutting blade in the other direction when next actuated, force-sensitive valve means adapted to actuate said pneumatic drive means and positioned in the path of travel of the ground meat as the same is extruded such that when the leading edge of the extruded ground meat has traveled a predetermined distance it impinges against said force-sensitive valve means actuating said pneumatic drive means to effect a cutting stroke of said cutting blade, a pushing plate mounted for travel in the direction of movement of said cutting blade, and means for effecting travel of said pushing plate with said cutting blade when said cutting blade has completed a predetermined portion of each cutting stroke such that each loaf of ground meat is delivered to said transport means as it is separated.

8. Apparatus for processing meat comprising: a first grinder for coarsely grinding meat; a mixer for receiving and mixing the coarsely ground meat from said first grinder, said mixer comprising a cylindrical drum mounted for rotation about its axis, a plurality of vanes mounted about the interior of said drum and angularly disposed with respect to said axis such that coarsely ground meat entering said cylindrical drum at one end thereof is mixed and moved toward the opposite end by said vanes when said drum is rotated, and means for rotating said drum; a second grinder adapted to receive the mixed, coarsely ground meat from the mixer and to continuously extrude finely ground meat in an agglomerate condition; a cutting mechanism for cutting the ground meat extruded from said second grinder into loaves; at least one downwardly-oriented chute adapted to receive loaves of ground meat and deliver the same into a container; and means for transporting loaves of ground meat from said cutting mechanism to said chute, said cutting mechanism comprising a cutting blade, means for driving said cutting blade, said driving means being effective when actuated to cause a cutting stroke of said cutting blade in a first direction or a second direction transversely of the direction of extrusion of the ground meat, reversing means operative when said cutting blade has completed a cutting stroke in said first or second direction to condition said driving means to drive said cutting blade in the other direction when said driving means is next actuated, and force-sensitive means for actuating said driving means when contacted by the leading edge of the ground meat being extruded from said second grinder such that the ground meat is cut into loaves of predetermined length.

9. In apparatus for processing meat, including a grinder for extruding ground meat in an agglomerate condition, the combination comprising: a cutting mechanism for cutting the ground meat being extruded from said grinder into loaves; a pair of downwardly-oriented, laterally-spaced chutes adapted to receive loaves of ground meat and deliver the same into respective containers; and means for transporting the loaves of ground meat from said cutting mechanism to said pair of chutes, said cutting mechanism including a cutting blade for severing said ground meat into loaves as it is extruded, pneumatic means for driving said cutting blade, said pneumatic means being effective when actuated to cause a cutting stroke of said cutting blade in a first direction or second direction transversely of the direction of extrusion of the ground meat, reversing means operative when said cutting blade has completed a cutting stroke in said first or second direction to condition said pneumatic means to drive said cutting blade in the other direction when said pneumatic means is next actuated, and force-sensitive means for actuating said pneumatic means when said force-sensitive means is contacted by a leading edge of the ground meat being extruded from said grinder, and means for moving each loaf of ground meat in the direction of movement of said cutting blade as said loaf of ground meat is being severed so as to remove said loaf of ground meat from contact with said force-sensitive means and deposit said loaf of ground meat in a laterally-displaced position on said transporting means whereby successively severed loaves of ground meat are deposited on said transporting means in laterally-staggered relationship causing each successive loaf to proceed toward a different one of said pair of chutes than the preceding loaf.

10. Apparatus for processing meat comprising: a first grinder for coarsely grinding the meat; a mixer for receiving and mixing the coarsely ground meat from the first grinder; a second grinder adapted to receive the mixed, coarsely ground meat from the mixer and to continuously extrude finely ground meat in an agglomerate condition; a cutting mechanism for cutting the ground meat extruded from said second grinder into loaves of predetermined length; a pair of downwardly-oriented, laterally-spaced chutes adapted to receive respective loaves of ground meat and deliver the same into respective containers; and means for transporting the loaves of ground meat from said cutting mechanism to said pair of chutes, said cutting mechanism including means for depositing successive loaves of ground meat severed by said cutting mechanism on to said transporting means in laterally staggered relationship causing each successive loaf to proceed toward a different one of said pair of chutes than the preceding loaf.

11. A cutting mechanism for cutting severable material emerging from a source into units of predetermined length, said cutting mechanism comprising: a cutting blade; pneumatic means effective when actuated to cause cutting movement of said cutting blade in a first direction or second direction transversely of the direction of emergence of said severable material; reversing means operative when said cutting blade has completed a cutting stroke in said first or second direction to condition said pneumatic drive means to drive said cutting blade in the other direction when said pneumatic drive means is next actuated; force-sensitive means for actuating said pneumatic drive means and positioned in the path of travel of the emerging severable material such that when the leading end of the emerging severable material has traveled a predetermined distance, it impinges against said force-sensitive means actuating said pneumatic drive means to effect a cutting stroke of said cutting blade; discharge means mounted for travel in the direction of movement of said cutting blade; and means for effecting travel of said discharge means when said cutting blade has completed a predetermined portion of each cutting stroke such that each unit of severable material is discharged from said cutting mechanism as said unit is severed.

References Cited by the Examiner

UNITED STATES PATENTS

| | | | |
|---|---|---|---|
| 1,528,887 | 3/1925 | Offenhauser | 17—35 X |
| 2,310,603 | 2/1943 | Taylor | 259—3 |
| 2,795,816 | 6/1957 | Spang et al. | 17—32 |
| 2,907,662 | 10/1959 | Covey. | |
| 3,167,000 | 1/1965 | Sassen et al. | 17—32 X |

SAMUEL KOREN, *Primary Examiner.*

LUCIE H. LAUDENSLAGER, *Examiner.*